(12) United States Patent
Jung et al.

(10) Patent No.: US 8,996,329 B2
(45) Date of Patent: Mar. 31, 2015

(54) SENSOR NODE AND CONTROL METHOD THEREOF

(75) Inventors: Ji Eun Jung, Seongnam-si (KR); Byung Hun Song, Namyangju-si (KR)

(73) Assignee: Korea Electronics Technology Institute, Seongnam-Si, Gyeonggi-Do (KR)

( * ) Notice: Subject to any disclaimer, the term of this patent is extended or adjusted under 35 U.S.C. 154(b) by 509 days.

(21) Appl. No.: 13/336,671

(22) Filed: Dec. 23, 2011

(65) Prior Publication Data

US 2012/0173186 A1  Jul. 5, 2012

(30) Foreign Application Priority Data

Dec. 29, 2010 (KR) ........................ 10-2010-0138106

(51) Int. Cl.
*G06F 19/00* (2011.01)
*G01D 21/00* (2006.01)
*H04W 52/02* (2009.01)
*H04W 84/18* (2009.01)

(52) U.S. Cl.
CPC ............ *G01D 21/00* (2013.01); *H04W 52/0277* (2013.01); *H04W 52/0261* (2013.01); *H04W 52/029* (2013.01); *H04W 52/0287* (2013.01); *H04W 84/18* (2013.01)
USPC .......................................... 702/116; 702/63

(58) Field of Classification Search
CPC ............. G01D 21/00; H04W 52/0277; H04W 52/0261; H04W 52/0287; H04W 52/029; H04W 84/18
USPC ................................................... 702/116, 63
See application file for complete search history.

(56) References Cited

U.S. PATENT DOCUMENTS

| | | | |
|---|---|---|---|
| 7,318,010 B2 * | 1/2008 | Anderson | 702/188 |
| 2009/0185542 A1 * | 7/2009 | Zhang et al. | 370/338 |
| 2010/0074157 A1 * | 3/2010 | Doh et al. | 370/311 |
| 2012/0095622 A1 * | 4/2012 | Lynch et al. | 701/3 |
| 2012/0245890 A1 * | 9/2012 | Wark et al. | 702/181 |

FOREIGN PATENT DOCUMENTS

| | | | | |
|---|---|---|---|---|
| KR | 101002358 | 12/2010 | | |
| WO | WO 2010111740 A1 * | 10/2010 | | G08B 1/08 |

OTHER PUBLICATIONS

Decentralized Control of Adaptive Sampling in Wireless Sensor Networks, Johnsen Kho, Alex Rogers, Nicholas R. Jennings, ACM Transactions on Sensor Networks, vol. 5, No. 3, Article 19, May 2009, 34 pages.*

(Continued)

*Primary Examiner* — Mohamed Charioui
*Assistant Examiner* — John Kuan
(74) *Attorney, Agent, or Firm* — Lowe Hauptman & Ham, LLP

(57) ABSTRACT

A sensor node for accurately guaranteeing a lifetime of a USN sensor node, and a control method thereof are provided. The sensor node control method includes receiving an operation time of a sensor node from a user; based on the input operation time, calculating a sensing rate which is the number of sensings of the sensor node per unit time; and according to the calculated sensing rate, controlling a sensing operation of the sensing node.

9 Claims, 3 Drawing Sheets

(56) References Cited

OTHER PUBLICATIONS

Decentralised Control of Adaptive Sampling and Routing in Wireless Visual Sensor Networks, (Ext Abstract), Johnsen Kho, Long Tran-Thanh, Alex Rogers, Nicholas R. Jennings, Proc. of 8th Int. Conf. on Autonomous Agents and Multiagent Systems (AAMAS 2009), Decker, Sichman, Sierra and Castelfranchi (eds.), May 10-15, 2009, Budapest, Hungary, p. 1237-38.*

Duarte-Melo et al., "Analysis of Energy Consumption and Lifetime of Heterogeneous Wireless Sensor Networks" Global Telecommunications Conference, 2002. GLOBECOM '02. IEEE (vol. 1).*

Alippi et al., "Adaptive Sampling for Energy Conservation in Wireless Sensor Networks for Snow Monitoring Applications" Mobile Adhoc and Sensor Systems, 2007. MASS 2007. IEEE International Conference Oct. 2007.*

Alippi et al., "Energy Management in Wireless Sensor Networks with Energy-hungry Sensors" IEEE Instrumentation and Measurement Magazine vol. 12, N. 2, Apr. 2009, pp. 16-23.*

Dunkels et al., "Software-based On-line Energy Estimation for Sensor Nodes" EmNets '07, Jun. 25-26, 2007, Cork, Ireland.*

Korean Office Action for 10-2010-0138106 dated Jan. 11, 2012.

* cited by examiner

SENSOR NODE AND CONTROL METHOD THEREOF

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Dec. 29, 2010, and assigned Serial No. 10-2010-0138106, the entire disclosure of which is hereby incorporated by reference.

TECHNICAL FIELD OF THE INVENTION

The present invention relates generally to a sensor node and a control method thereof. More particularly, the present invention relates to a sensor node for accurately guaranteeing a lifetime of a USN sensor node, and a control method thereof.

BACKGROUND OF THE INVENTION

A sensor network, which is called a wireless sensor network or a ubiquitous sensor network, is a network including a plurality of sensor nodes and a sink node which sends information of the sensor node to the outside. For the automated remote information collection, the sensor node senses, processes, and collects various information.

To continuously sense and transmit necessary data at a specific location, the sensor node in the sensor network needs to operate for a long time with a low power. Accordingly, it is necessary to operate the sensor node with the limited battery capacity for a time intended by a user. For doing so, it is required to predict the accurate battery use time and to set a sensing cycle according to the prediction. In general, the battery use time of the sensor node is predicted using a method which divides the remaining battery capacity by the energy consumed by the sensor node.

Since this method sets the sensing cycle by dividing the remaining battery capacity by the energy consumed by the sensor node, there is an error between the calculated battery use time and the actual battery use time and the error range expands with time.

FIG. 1 is a graph of a lifetime prediction error rate based on the time in a conventional sensor node. FIG. 1 shows the error rate of the difference between the actual operation time per hour and the predicted operation time based on the remaining battery capacity when the sensor node operates for 20 hours. The sensor node performs high-workload and low-workload in two environments with 50% duty cycle. Herein, the high-workload continuously senses and then immediately transmits data over the radio, and the low-workload senses once per 1 minute and then sends data over the radio. The 50% duty cycle iterates the sensing and the data transmission per 30 seconds.

As shown in FIG. 1, there is the great difference between the battery use time calculated using the general method and the actual battery use time, and the error range expands as the time goes by. This is because the sensing cycle is randomly set based on the inaccurate information. In result, the use time of the USN node is inaccurately predicted.

SUMMARY OF THE INVENTION

To address the above-discussed deficiencies of the prior art, it is a primary aspect of the present invention to provide a sensor node for accurately guaranteeing a lifetime of a USN sensor node, and a method for controlling the sensor node.

According to one aspect of the present invention, a sensor node control method includes receiving an operation time of a sensor node from a user; based on the input operation time, calculating a sensing rate which is the number of sensings of the sensor node per unit time; and according to the calculated sensing rate, controlling a sensing operation of the sensing node.

The calculating operation may include detecting a remaining battery capacity of a sensor; and calculating the sensing rate by dividing the remaining battery capacity by an energy consumption per sensing and the operation time.

The energy consumption per sensing may include an energy consumed in the sensing operation of the sensor and an energy consumed by the sensor to transmit sensing data.

When a set time passes after the calculation operation, the sensing rate may be recalculated by repeating the calculation operation.

According to another aspect of the present invention, a sensor node includes a sensor for sensing a surrounding environment; an input part for receiving an operation time of the sensor from a user; and a controller for calculating a sensing rate which is the number of sensings of the sensor per unit time, based on the operation time input through the input part, and controlling a sensing operation of the sensor according to the calculated sensing rate.

The controller may include a network profiler for monitoring an event relating to networking of the sensor node; a HEMA for monitoring power state of the sensor node; and an operation time optimizer for calculating the sensing rate and controlling the sensing operation of the sensor according to the calculated sensing rate. The operation time optimizer may obtain remaining battery capacity information of the sensor node from the HEMA, and calculate the sensing rate by dividing the remaining battery capacity by an energy consumption per sensing and the operation time.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF THE INVENTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention.

Figure 1:
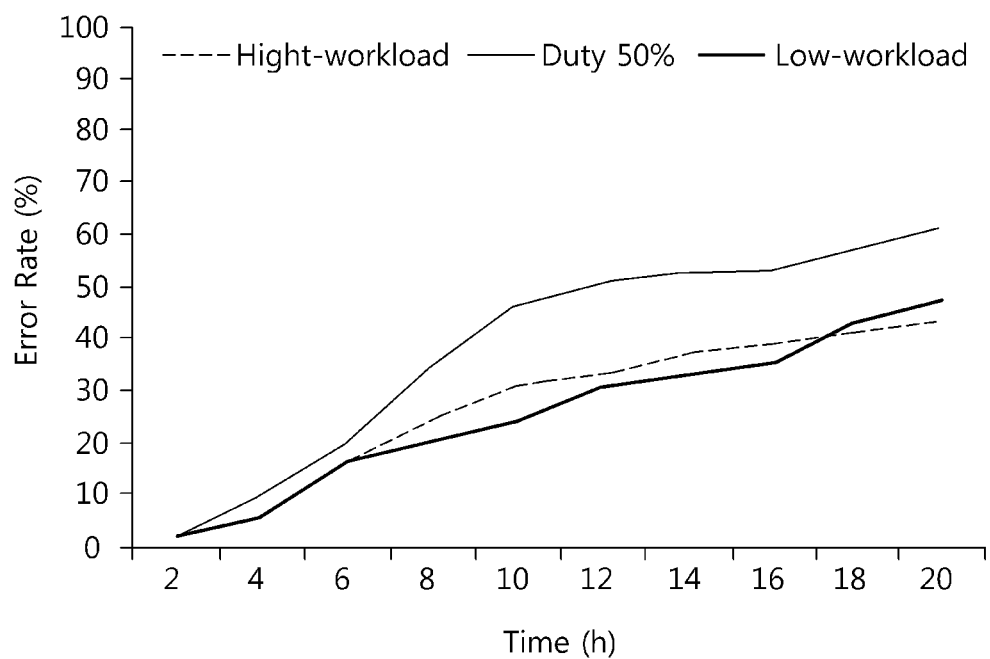
FIG. 1 is a graph of a lifetime prediction error rate based on time in a conventional sensor node.
Figure 2:
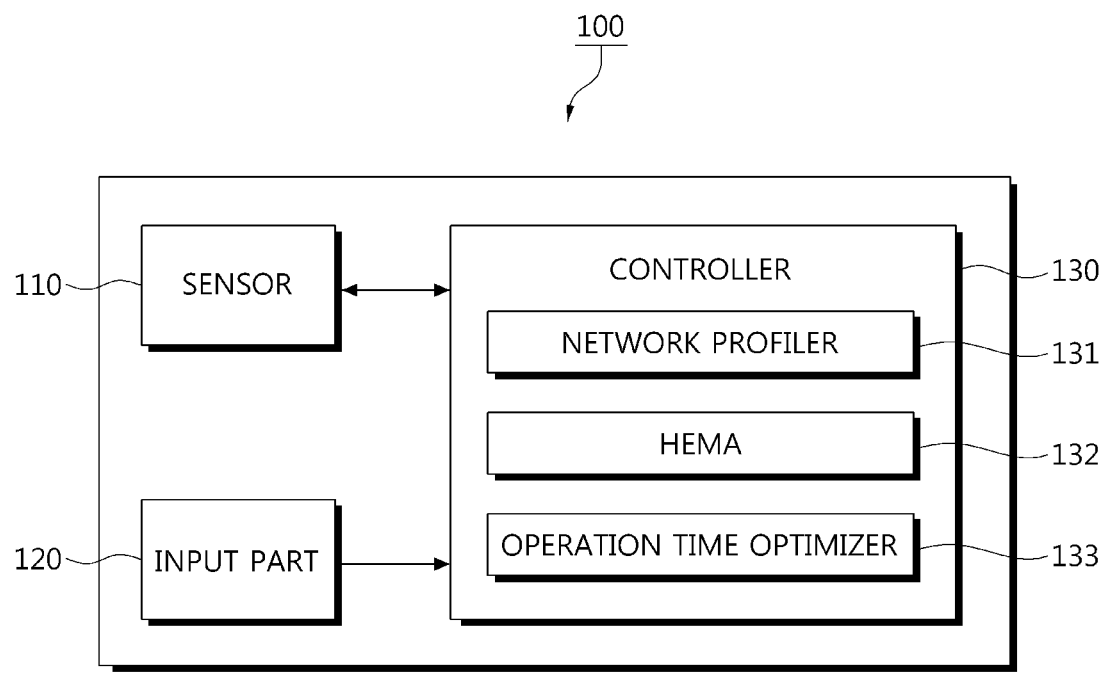
FIG. 2 is a block diagram of a sensor node according to an exemplary embodiment of the present invention.

FIG. 2 is a block diagram of a sensor node according to an exemplary embodiment of the present invention. The sensor node 100 includes a sensor 110 for sensing a surrounding environment, an input part 120 for receiving an operation time of the sensor 110 from a user, and a controller 130 for calculating a sensing rate which is the number of sensings per unit time of the sensor 110 based on the operation time input through the input part 120, and controlling the sensing operation of the sensor 110 according to the calculated sensing rate.

The sensor 110 obtains data of the environment by sensing the surrounding environment. The sensor 1110 can continuously or periodically sense. The sensor 110 can be, for example, a sensor for measuring temperature, a sensor for measuring humidity, or a sensor for detecting an object.

The input part 120 receives the operation time of the sensor 110 from the user. The controller 130 controls the sensing operation of the sensor 110 based on the operation time input through the input part 120. That is, the controller 130 calculates the sensing rate which is the number of the sensings of the sensor 110 per unit time, based on the input operation time, calculates how much the sensor 110 senses per unit time according to the sensing rate, and thus controls the sensor 110 to sense for the number of the calculated times. The sensing rate indicates the number of the sensings per unit time, and the unit time can be the hour, the minute, or the second and can vary according to a type or a location of the sensor node 100.

The controller 130 includes a network profiler 131 for monitoring an event relating to the networking of the sensor node 100, a Hardware-assisted Energy Monitoring Architecture (HEMA) 132 for monitoring power state of the sensor node 100, and an operation time optimizer 133 for calculating the sensing rate.

The network profiler 131 monitors and stores the event relating to the network. To predict most of the energy use of the network, the network profiler 131 tracks and stores information relating to the network. In a low-power sensor node, a network device is one of the major energy consumptions. Particularly, since the operation pattern varies according to a protocol used in the network device, a distributed location, and the relation with neighboring nodes and the energy consumption behavior also changes, accurate information tracking is required.

The network profiler 131 periodically collects and sends data to a host. The network topology can be constructed in a relatively simple tree according to situational characteristics of the node distribution. Hence, the energy consumption pattern can be periodic, and The network profiler 131 operates according to its sensing cycle or the sensing cycle of the neighboring node. On account of these characteristics, the network profiler 131 predicts the approximate future network usage based on the network usage of an initial time based on the decision making algorithm used, and predicts the energy used by the network device based on the predicted future network usage.

Since the network operates in accordance with the sensing cycle, the cycle can be regulated together with the sensor node 100 without using an algorithm for reducing the power consumption of the separate network device. According to the location of the topology, a node providing a routing function between a neighboring node and a gateway calculates the separate energy consumption by monitoring the network usage for the routing.

The HEMA 132 monitors the power state of the sensor node 100. The HEMA 132 obtains information of the remaining battery capacity by monitoring the sensor node 100 and sends the obtained information to the operation time optimizer 133.

The operation time optimizer 133 calculates the sensing rate. The sensing rate is the number of the sensings of the sensor 110 per unit time. The operation time optimizer 133 calculates the sensing rate such that the sensor node 100 can operate for a maximum time as closely as possible to the operation time set by the user, and regulates the sensing cycle of the sensor 110 based on the sensing rate.

To predict the lifetime of the sensor node 100 in real time, data of the current battery capacity and the current energy consumed is required and this data can be obtained from the HEMA 132 which monitors the power state of the sensor node 100. When the remaining battery capacity of the sensor node 100 is Rnow and the current energy consumed per unit time is Cnow, the predicted battery use time Lpredict is as follows.

$$L\text{predict} = R\text{now}/C\text{now} \quad \text{[Equation 1]}$$

Meanwhile, when the sensing rate which is the number of the sensings of the sensor per unit time to operate for the maximum time as closely as possible to the user's desired operation time is Scurrent and the energy consumed per sensing of the sensor 110 is Csample, the energy C1 consumed per unit time is as follows.

$$C1 = C\text{sample} \times S\text{current} \quad \text{[Equation 2]}$$

In Equation 1, Lpredict is substituted by Luser which is the operation time of the sensor node 100 as input by the user, and the current energy Cnow consumed per unit time of Equation 1 is substituted by the energy C1 consumed per unit time according to the sensing rate of Equation 2 as follows.

$$L\text{user} = R\text{now}/(C\text{sample} \times S\text{current}) \quad \text{[Equation 3]}$$

From Equation 3, Scurrent is given by the following equation.

$$S\text{current} = R\text{now}/(C\text{sample} \times L\text{user}) \quad \text{[Equation 4]}$$

That is, the sensing rate Scurrent can be calculated by dividing the current battery capacity Rnow by the energy Csample consumed per sensing and the user set operation time Luser.

When the sensing rate is calculated, the controller 130 can optimize the operation time of the sensor node 100 to the user set operation time by regulating the number of the sensings of the sensor 110 per unit time and controlling the sensor 110.

Figure 3:
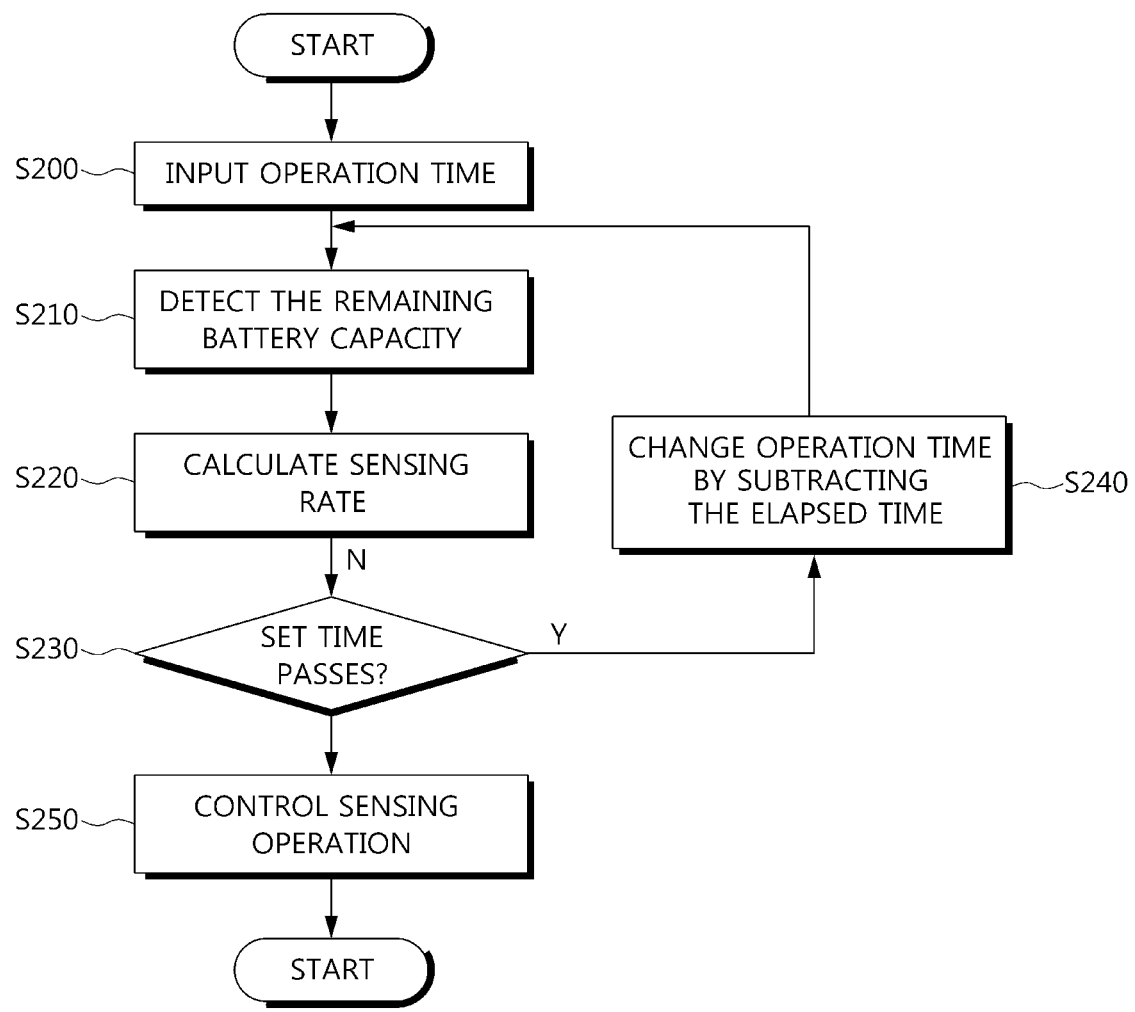
FIG. 3 is a diagram of a method for controlling the sensor node according to an exemplary embodiment of the present invention.

FIG. 3 is a diagram of a method for controlling the sensor node according to an exemplary embodiment of the present invention. The sensor node control method receives the sensor node operation time from the user (S200) and controls the sensor node by calculating the sensing rate based on the input operation time.

When the operation time is input, the remaining battery capacity of the sensor node is detected (S210). When the detected remaining battery capacity is divided by the energy consumption per sensing and the operation time, the sensing rate is calculated (S220). At this time, the energy consumption per sensing can include the energy consumed in the sensing operation of the sensor and the energy consumed by the sensor to send the sensing data.

When the sensing rate is calculated, the method controls the sensor based on the sensing rate. When a preset time passes after the calculation (S230:Y), it is preferred to recalculate sensing rate by repeating the calculation. When the sensing rate is recalculated, it is preferred to calculate the sensing rate by setting the time obtained by subtracting the elapsed time from the user input operation time, to a new operation time. For example, when the user sets the operation time of the sensor node to 10 hours, the detected remaining battery capacity is 100, and the energy consumption per sensing is 5, the sensing rate is 100/(5×10)=2 times/hour. That is, the sensor senses twice per hour.

However, it is assumed that the user sets the operation time and to recalculate the sensing rate together at time intervals of 2 hours. Since the operation time is set to 10 hours, when the remaining battery capacity is checked after two hours, the battery may not be consumed as predicted because of environmental influences or the battery. That is, since the sensor, which senses twice per hour during the initial two hours, senses for 4 times in total and the consumed energy is 4×5=20, 20 is consumed in the initial battery capacity and the remaining battery capacity is predicted to be 80. By contrast, the remaining battery capacity can be 60. In this case, when continuously sensing twice per hour according to the initial sensing rate, it is highly likely that the sensor node ends its operation ahead of the user set operation time.

Thus, to consider those various factors, the sensing rate can be recalculated within the user set operation time and accordingly the sensor node can survive for the maximum time as closely as possible to the user set operation time.

Figure 4:
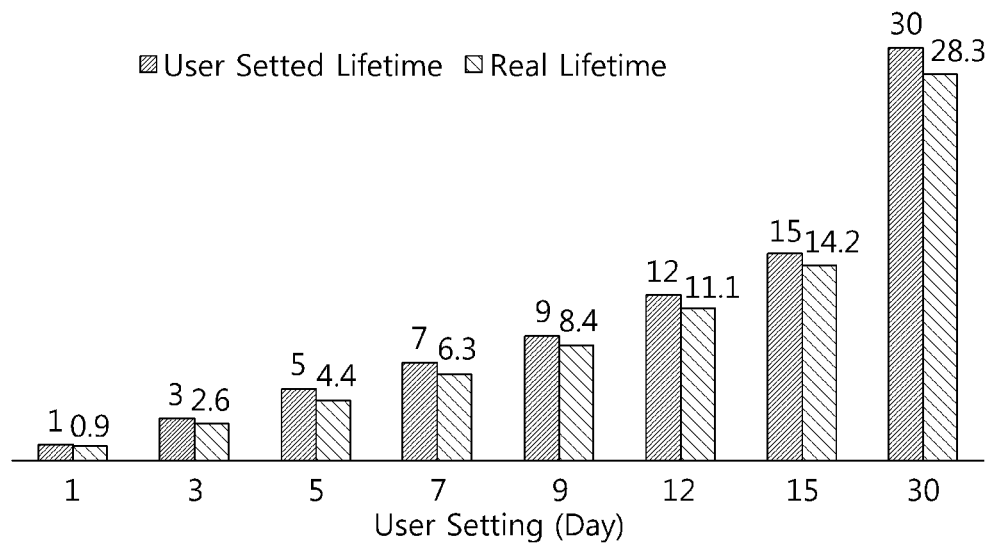
FIG. 4 is a graph of a real lifetime according to the set operation time of the sensor node controlled according to an exemplary embodiment of the present invention.

FIG. 4 is a graph of a real lifetime according to the set operation time of the sensor node controlled according to an exemplary embodiment of the present invention. The user sets the operation time of the sensor to 1 day, 3 days, 5 days, 7 days, 9 days, 12 days, 15 days, and 30 days, and the experiment measures the time until the sensor node actually consumes all of the battery. FIG. 4 expresses 24 hours by converting to 10 with the first decimal place.

As shown in the results, the sensor node ends its operation before the user set operation time from 1 day to 30 days, within the margin of error of 13%. After 9 days, the error rate decreases and the operation time remains in the margin of error of 5~6%. This is because the sensing rate lowers and the influence of the operation time optimization decreases. In general, the operation time of the node ends ahead of the user set operation time because the voltage drops abruptly in the last remaining capacity according to the battery characteristics. When the sensor node is operated using the present method for calculating the sensing rate, it can approach the user set operation time as closely as possible.

Figure 5:
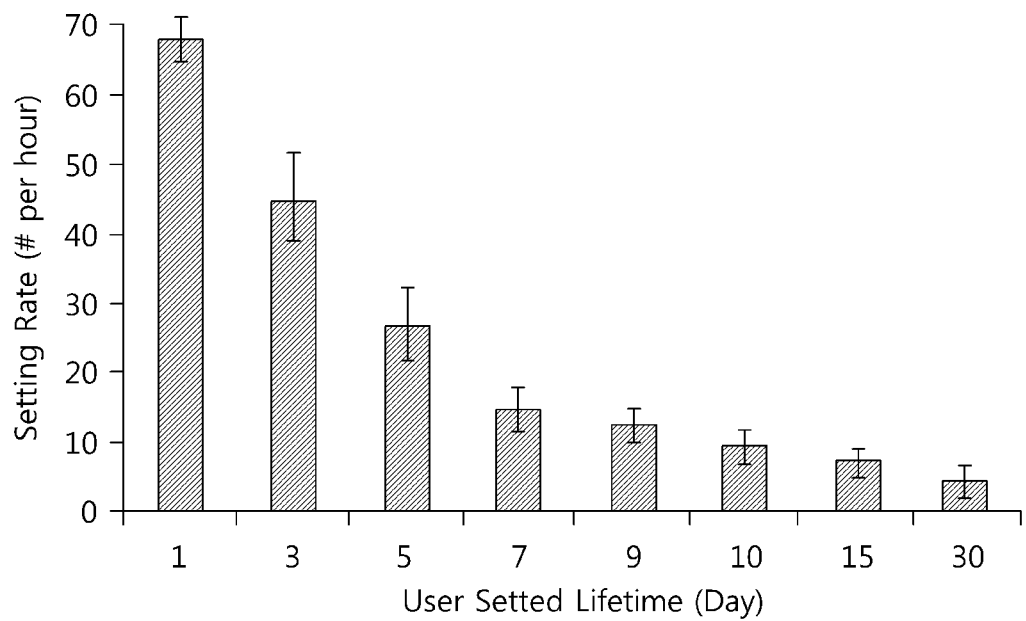
FIG. 5 is a graph of a sensing rate according to the set operation time of the sensor node controlled according to an exemplary embodiment of the present invention.

FIG. 5 is a graph of the sensing rate according to the set operation of the sensor node controlled according to an exemplary embodiment of the present invention. FIG. 5 shows the average sensing rate indicating how the sensor node changes the sensing rate per unit time according to the user set operation time. Herein, the sensing rate can be the number of the sensings per second. At this time, there is a difference between the average sensing rate and the sensing rate measured per hour because the instantaneously calculated lifetime differs from the whole lifetime according to chemical characteristics of the battery. The mark I at the top of the bar graph of FIG. 5 indicates the variation rate of the sensing rate. As the operation time lengthens, the variation range also decreases.

According to the present invention, the user sets his/her intended operation time and the sensing rate is calculated based on the user set operation time to automatically regulate the sensing cycle. Thus, the sensing cycle is adequately controlled according to the distribution environment of the sensor node or the time flow, and the lifetime of the USN sensor node can be optimized.

Also, even when the battery of the sensor cannot be replaced for a long time, the sensor node is automatically controlled according to the use time and problems caused by the operation termination of the sensor node can be prevented.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A sensor node control method for controlling a sensor node,
   the sensor node comprising a sensor configured to sense a surrounding environment of the sensor node, an input part and a controller,
   the controller comprising a Hardware-assisted Energy Monitoring Architecture (HEMA) and an operation time optimizer,
   the method comprising:
   receiving, by the input part, operation time of a sensor from a user;
   monitoring, by the HEMA, a power state of the sensor node;
   obtaining, by the operation time optimizer, a remaining battery capacity of the sensor node from the power state monitored by the HEMA;
   calculating, by the operation time optimizer, a sensing rate, which is a number of sensings of the sensor node per unit time, based on the received operation time, the remaining battery capacity, and energy consumed per sensing of the sensor; and
   controlling, by the operation time optimizer, a sensing operation of the sensing node according to the calculated sensing rate,
   wherein the calculating comprises calculating the sensing rate by dividing the remaining battery capacity by the energy consumption per sensing of the sensor and the operation time.

2. The sensor node control method of claim 1, wherein the calculating comprises:
   calculating a first energy to be consumed by the sensor node in the sensing operation;
   calculating a second energy to be consumed in transmitting the sensing data to an external device; and
   calculating the energy consumption per sensing by adding the first energy and the second energy.

3. The sensor node control method of claim 1, wherein, when a set time passes after the sensing rate is calculated, the sensing rate is recalculated by repeating the calculating.

4. The sensor node control method of claim 2, wherein the calculating the second energy comprises calculating the second energy based on at least one selected from the group consisting of
   a protocol used in the sensor node,
   a distributed location of the sensor node, and
   a connection with neighboring nodes.

5. The sensor node control method of claim 2, wherein the calculating the second energy comprises:
   monitoring an event related to networking operation of the sensor node predicting a network usage of the sensor node based on a former network usage of the sensor node during an initial time; and calculating the second energy based on the predicted network usage.

6. A sensor node, comprising:

a sensor configured to sense a surrounding environment of the sensor node;

an input part configured to receive an operation time of the sensor from a user; and a controller comprising:

a Hardware-assisted Energy Monitoring Architecture (HEMA) configured to monitor a power state of the sensor node; and an operation time optimizer configured to obtain a remaining battery capacity of the sensor node from the power state monitored by the HEMA, calculate a sensing rate, which is a number of sensings of the sensor per unit time, based on the operation time input through the input part, the remaining battery capacity, and energy consumed per sensing of the sensor, and control a sensing operation of the sensor according to the calculated sensing rate, wherein the operation time optimizer is configured to calculate the sensing rate by dividing the remaining battery capacity by the energy consumption per sensing of the sensor and the operation time.

7. The sensor node of claim 6, wherein the operation time optimizer is further configured to calculate the energy consumption per sensing based on at least one selected from the group consisting of a protocol used in the sensor, a distributed location of the sensor, and a connection with neighboring sensors.

8. The sensor node of claim 6, further comprising a network profiler configured to monitor an event related to networking operation of the sensor node, wherein the operation time optimizer is further configured to predict a network usage of the sensor node based on a former network usage of the sensor node during an initial time, and calculate the energy consumption per sensing based on the predicted network usage.

9. A sensor node, comprising:

a sensor configured to sense a surrounding environment of the sensor node;

an input part configured to receive an operation time of the sensor from a user; and a controller configured to obtain a remaining battery capacity of the sensor node, calculate a sensing rate which is a number of sensings of the sensor per unit time, based on the operation time input through the input part, wherein the sensing rate satisfies the following equation:

$$S_{current} = R_{now} / (C_{sample} \times L_{user}),$$

where $S_{current}$ is the sensing rate, $R_{now}$ is a remaining battery capacity, $C_{sample}$ is energy consumed per sensing of the sensor, and $L_{user}$ is the received operation time, and control a sensing operation of the sensor according to the calculated sensing rate.

* * * * *